(12) United States Patent
Granquist et al.

(10) Patent No.: US 6,365,120 B1
(45) Date of Patent: Apr. 2, 2002

(54) METHOD FOR HARDENING GRANULAR INORGANIC SALT COMPOUNDS

(75) Inventors: Victor Martin Granquist; Robert Paul Kern, Jr., both of Beaufort, SC (US)

(73) Assignee: Lobeco Products, Inc., Lobeco, SC (US)

( * ) Notice: Subject to any disclaimer, the term of this patent is extended or adjusted under 35 U.S.C. 154(b) by 0 days.

(21) Appl. No.: 09/514,277

(22) Filed: Feb. 28, 2000

(51) Int. Cl.[7] ............................. C01C 1/18; C05G 5/00
(52) U.S. Cl. ............................. 423/268; 71/34; 71/58; 71/64.12; 252/383; 423/396
(58) Field of Search ............................. 71/34, 58, 61, 71/64.12; 423/268, 396; 252/383

(56) References Cited

U.S. PATENT DOCUMENTS

| 3,230,038 A | * | 1/1966 | Wilson ..................... 423/268 |
| 3,485,580 A | | 12/1969 | Mischel et al. |
| 3,640,697 A | * | 2/1972 | Toops, Jr. ..................... 423/396 |
| 4,326,976 A | * | 4/1982 | Logan et al. ................ 252/383 |
| 4,717,555 A | * | 1/1988 | Newman et al. ............. 423/396 |
| 6,022,386 A | * | 2/2000 | Vogel et al. ................. 423/396 |

FOREIGN PATENT DOCUMENTS

| PL | 86493 | * | 1/1924 |
| PL | 120497 | * | 12/1978 |

* cited by examiner

Primary Examiner—Wayne Langel
(74) Attorney, Agent, or Firm—Robert C. Brown

(57) ABSTRACT

Solid inorganic particulate salts having increased hardness are produced by incorporating a novel additive composition comprised of ammonium sulfate and a naphthalene sulfonate compound.

13 Claims, No Drawings

METHOD FOR HARDENING GRANULAR INORGANIC SALT COMPOUNDS

FIELD OF THE INVENTION

This invention relates to a method of hardening prills and granules of inorganic salt compounds to reduce clumping and powder and dust formation.

BACKGROUND OF THE INVENTION

A variety of inorganic salt compositions find extensive use in agriculture as well as in other applications. Examples of inorganic salt compounds which are used for such purposes include ammonium nitrate, di-ammonium phosphate, mono-ammonium phosphate, potassium nitrate, potash (potassium carbonate and potassium chloride) and various other inorganic salts.

To prevent caking and clumping and to obtain other desirable physical properties, it is customary to coat or otherwise modify these materials with one or more of a variety of different internal additives. Illustrative of these materials are magnesium oxide, various clays and mixtures of a variety of different inorganic salts. While these materials impart some beneficial properties, their use for these purposes has some serious disadvantages. For example, while magnesium oxide when applied to ammonium nitrate particulate improves hardness and stability, it is difficult to apply as it must be metered and handled as a solid. When incorporated in ammonium salts, magnesium oxide can also cause an undesirable release of ammonia. The application of magnesium oxide to inorganic salts can also result in increased hygroscopicity which may increase the likelihood of clumping and agglomeration which is highly undesirable.

Clay additives also present handling problems, due to their insolubility, which makes it necessary to handle them as solids and in the usual case, disperse them with difficulty, in the melt liquor used to produce the solid prill or granule of the inorganic salt being treated. Because they are inert and must be used in significant amounts, they also degrade the efficacy of the product because of dilution. Most of these modifiers also have an undesirable effect on the color of the product Most inorganic salt mixtures used as modifiers for inorganic salts tend to be expensive, yield inconsistent results and require relatively high concentrations to be effective, thereby adversely affecting performance of the product, due to the effect of dilution. For example, ammonium sulfate is a well known hardening (anti-clumping and anti-dusting) agent for ammonium nitrate. Unfortunately it must be present in an amount of at least about 2% by weight of the total final composition to be effective. It also presents some very difficult manufacturing problems due to a necessity to form the sulfate salt in situ during the manufacturing process.

SUMMARY OF THE INVENTION

It has now been found that the use of a mixture of ammonium sulfate with certain naphthalene sulfonates (the expression "naphthalene sulfonate" as used herein includes dimers and trimers of the described class of naphthalene sulfonates as well as monomeric naphthalene sulfonates) for improving the physical properties of inorganic salt granules and prills produces an unexpected and synergistic improvement in the physical properties of these materials. This invention also is directed to a process for preparing said mixture and for hardening inorganic salt granules and prills with said mixture by introducing an aqueous solution of ammonium sulfate and a naphthalene sulfonate into the melt liquor of the inorganic salt.

DETAILED DESCRIPTION OF THE INVENTION

Illustrative of the inorganic salt compounds which can benefit from the invention are ammonium nitrate, di-ammonium phosphate, mono-ammonium phosphate, potassium nitrate, potash and complex fertilizer compositions. The invention is especially useful for the manufacture of fertilizer grade ammonium nitrate having superior hardness and stability properties.

The advantages achieved by the practice of this invention derive from the dramatic improvement in the physical properties of inorganic salt granules and prills which result from the introduction of a novel hardening mixture, comprising a naphthalene sulfonate compound and ammonium sulfate, into the inorganic salt. This novel mixture is a used in the form of an aqueous mixture of ammonium sulfate and one or more naphthalene sulfonate compounds of the formula (including dimers and trimers thereof):

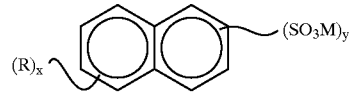

wherein M is ammonium or an alkali or alkaline earth metal; each R is independently, hydrogen or an alkyl substituent having from 1 to 12 carbon atoms; x is a whole number of from one to seven; and y is a whole number of from one to two with the provisos that the total number of carbon atoms contained in all of the R groups combined may not exceed 16 and the sum of x and y may not exceed eight. Illustrative of the useful naphthalene sulfonate compounds are sodium 1-methylnaphthalene sulfonate, potassium 1-methyl-3-methylnaphthalene sulfonate, potassium 1-isopropylnaphthalene sulfonate, calcium 4-ethylnaphthalene sulfonate as well as dimers, trimers and mixtures thereof. The useful naphthalene sulfonate compounds are easily prepared by sulfonation of naphthalene or an appropriately alkylated naphthalene compound followed by neutralization with ammonium hydroxide or an alkali or alkaline earth metal hydroxide compound. The addition of formaldehyde to the reaction mixture after sulfonation and before neutralization will yield the dimer or trimer form of the naphthalene sulfonate compound. The hardening mixture is preferably employed in an amount such that it will be present in an amount equal to between 0.05 percent to about 0.2 percent of the total weight of the final salt product.

It has also been found that by adding one or more optional alkali or alkaline earth metal benzene sulfonate compounds, which may have one or more alkyl substituents containing a total number of carbon atoms between three and 12, further improvements in the physical properties of the inorganic salt compound can be achieved. Illustrative of the useful optional alkyl benzene sulfonate compounds are sodium isopropyl benzene sulfonate, ammonium isopropyl benzene sulfonate, potassium di-isopropyl benzene sulfonate, magnesium xylene sulfonate, calcium 2-methyl-4-isopropylbenzene sulfonate, sodium butyl benzene sulfonate, ammonium di-butyl benzene sulfonate, potassium hexyl benzene sulfonate, sodium octyl benzene sulfonate and sodium dodecyl benzene sulfonate.

The novel hardening additive of this invention is prepared by first dissolving a naphthalene sulfonate compound in water at a concentration of from about one percent to about 50 percent by weight. Ammonium sulfate is then added to the solution in an amount equal to from about 10 percent to about 70 percent by weight of the final solution. The optional benzene sulfonate compound may also be added at this time in an amount ranging from about one percent to about five percent by weight of the solution.

In a typical commercial production of solid inorganic salt prills or granules, using ammonium nitrate as an example, nitric acid and anhydrous ammonia are reacted together in a neutralizer to produce a slightly acid aqueous solution of ammonium nitrate at a concentration of about 82 to 83 percent by weight. It is preferred to incorporate the novel hardening additive of this invention into the inorganic salt compound melt at this stage. This is easily accomplished by the simple expedient of introducing the liquid additive mixture into a melt liquor of the inorganic salt. The amount added should be sufficient to produce an amount of the non-aqueous component of the additive equal, preferably, to from about 0.05 percent to about 0.2 percent by weight of the final inorganic salt product. If an optional benzene sulfonate is employed, the benzene sulfonate compound may be present in an amount of up to about 0.02 weight percent.

The aqueous solution is next passed through an evaporator to remove most of the water. This results in a "melt" having an ammonium nitrate concentration on the order of 95 percent or higher. It is preferred to introduce the additive solution of this invention into the melt at this stage after the solution has passed through the evaporator. The higher density materials, normally those melts having a concentration nitrate salt greater than 98 percent are preferred for agricultural use as fertilizer.

In the next stage the melt is usually converted into prills or granules.

Prills are produced by spraying the melt downward from the top of a tower against a counter-current air stream within the tower cavity which cools the droplets to form solid prills as the melt crystallizes. The prills are collected at the bottom of the tower after which they may be further dried or cooled or coated in the conventional manner. The prills may also be coated at this stage with any of the conventional coatings such as clay or wax as an aid to prevent caking.

To prepare a granular product, the inorganic salt melt is simply sprayed onto smaller, usually recycled, inorganic salt particles which are being tumbled in for example, a rotating drum or pan. The melt cools and crystallizes on the surface of the particles. The now larger particles are sized and then cooled if necessary. The undersize particles are recycled back to the sprayer to serve as the substrate for further production of granules. Oversize granules are ground to a smaller size and are also returned to the sprayer.

Inorganic salt granules and prills prepared in the manner described above using the novel additive composition of this invention have an unexpectedly higher hardness, and thus superior physical properties, than salt granules produced by conventional methods despite using a smaller overall amount of additive than is employed in the conventional manufacture of inorganic salt granules. Each of the essential ingredients of the novel additive composition of this invention is capable of individually producing an increase in the hardness of the salt product. What is unexpected and surprising is that when combined, the resultant increase in hardness exceeds the combined improvement in hardness that is contributed by these materials when employed alone, by a substantial margin.

EXAMPLES

Example 1

Preparation of Samples for Evaluation

Wafer Method

Measured amounts of additive composition with a 25.0 gram sample of ammonium nitrate and melted at a temperature of 170° to 175° C. in a covered beaker in a forced draft oven. The resultant liquid melt was stirred to ensure complete mixing with the additive composition and the further heated to achieve and maintain a temperature of from 170° to 175° C. The sample was then removed from the oven and poured into an aluminum weighing dish of 70 mm diameter positioned on a level surface and then covered with foil. Neat samples of ammonium nitrate without the novel additive of the invention were prepared in the identical manner. After cooling for at least two hours the samples were then tested in accordance with the following procedure.

Prill Method

Ammonium nitrate was weighed into a covered flask and heated to 180° C. to form a melt. A measured amount of the hardening additive of the invention was then mixed into the melt while maintaining the temperature at 180° C. One drop of the mixture was transferred into each of a plurality of individual depression contained in a Teflon mold. The mold was then held at a temperature of 80° C. for one hour. The resultant prills were removed from the mold and then held at room temperature in a low humidity environment for approximately 24 hours. A minimum of 40m prills were produced and tested for each hardness test described below using the prill method.

EXAMPLE 2

Hardness Test Procedure

Prills

Individual prills prepared by the procedure described above were compressed between to flat plates using a Chatillon Model DFI 100 force gauge until collapse. Each data point in the data presented below is the average maximum force recorded for a minimum of 40 test replications. All tests were conducted under room temperature conditions and at a humidity level below 60%.

Wafers

Ammonium nitrate wafers prepared as described above were removed from the weighing dish and placed on a mandrel, in an environment of less than 60% humidity and at a temperature of 20 to 23° C. The mandrel had a central bore 50 mm in diameter. A flat circular probe having a diameter of one half inch was mounted in a force gauge and centered above the unsupported area of the wafer above the central bore of the mandrel. The probe was advanced slowly until rupture occurred. The force gauge gave an automatic reading of the maximum force applied to the wafer prior to rupture.

Example 3

High Density Ammonium Nitrate Prills

High-density ammonium nitrate prills were prepared and tested by the prill procedures set forth above. The results obtained from this testing are set forth below:

| Ammonium Sulfate Conc. | Naphthalene Sulfonate* Conc. | Hardness Force in kilograms | % Hardness Increase |
|---|---|---|---|
| 0 | 0 | 3.75 kg | N/A |
| 250 ppm | 0 | 5.25 kg | 40% |
| 500 ppm | 0 | 4.88 kg | 30% |
| 0 | 12.5 ppm | 5.13 kg | 37% |
| 250 ppm | 12.5 ppm | 7.5 kg | 100% |
| 500 ppm | 12.5 ppm | 7.25 kg | 93% |

*dimer/trimer form

From the table, it will be observed that the addition of 250 ppm of ammonium sulfate alone, resulted in a hardness increase of 1.5 kg over untreated ammonium nitrate. The addition of 12.5 ppm sulfonate provided a hardness increase of 1.38 kg over untreated ammonium nitrate. The increase in hardness resulting from the combined addition of the same amounts of both compositions, produced an increase of 3.75 kg in hardness over the hardness of untreated ammonium nitrate, a substantial increase over and above the expected additive effect of the two compositions which would amount to only a 2.88 kg increase. The synergistic effect was again seen when 500 ppm of ammonium sulfate was used with 12.5 ppm of the sulfonate additive. In this case a hardness force of 7.25 kg was obtained, demonstrating an increase of 3.50 kg which amounts to a gain of 0.70 kg over and above the expected increase of 2.80 kg, based upon the additive effect of the individual contributions of the same amounts of the individual additives when used alone.

Example 4

High Density Ammonium Nitrate Granules

This experiment was to demonstrate the effectiveness of the novel additive of the invention in use with salt granules produced in full-scale commercial ammonium nitrate production. Individual granules were subjected to the same crushing procedure as is described above for testing prill hardness. Each of the data points presented below represents the mean average of at least 20 test replications.

| Ammonium Nitrate | Hardness in pounds | % Hardness Increase |
|---|---|---|
| No Additive | 3.63 lbs. | N/A |
| 500 ppm Additive* | 4.675 lbs. | 28.8% |
| 1000 ppm Additive* | 5.375 lbs. | 48.1% |

*37.8 w/% Ammionium Sulfate; 3.78% w/% Sodium Naphthalene Sulfonate (dimer/trimer form) in water.

Example 5

Di-ammonium Phosphate Wafers

This experiment was conducted to demonstrate the efficacy of the invention in improving the hardness of di-ammonium phosphate salt products.

| Di-ammonium Phosphate | Hardness in Pounds: (wafer test protocol) | percent hardness increase: |
|---|---|---|
| No Additive | 2.6 pounds | N/A |
| 5000 ppm Additive* | 4.3 pounds | 65.4% |

*37.8 w/% Ammonium Sulfate; 3.78% w/% Sodium Naphthalene Sulfonate (dimer/trimer form) in water.

Example 6

Ammonium Nitrate Wafers

This test was conducted to demonstrate the influence of the concentration of hardening additive introduced on the hardening effect.

| Amount of Additive* Added to Nitrate Salt | Force Necessary to Break Wafer |
|---|---|
| 0 | 5.7 pounds |
| 500 ppm | 8.9 pounds |
| 750 ppm | 9.2 pounds |
| 1000 ppm | 8.1 pounds |
| 1500 ppm | 9.1 pounds |

*37.8 w/% Ammonium Sulfate; 3.78% w/% Sodium Naphthalene Sulfonate (dimer/trimer form) in water.

This experiment indicates that the optimum amount additive needed to achieve the advantages of this invention is on the order of from about 500 to about 1000 ppm and most preferably from about 500 to about 750 ppm.

We claim:

1. A method for the production of a hardened inorganic salt composition which comprises adding to a melt of said inorganic salt composition, a hardening solution comprised of a solution of a naphthalene sulfonate composition and ammonium sulfate wherein said naphthalene sulfonate solution is comprised of at least one member selected from the group consisting of monomers, dimers and trimers and mixtures thereof, of a naphthalene sulfonate of the formula:

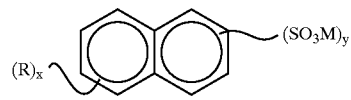

wherein M is ammonium or an alkaline or alkaline earth metal; each R is independently, hydrogen or an alkyl substituent having from 1 to 12 carbon atoms; x is a whole number from one to seven and y is a whole number from one to two with the provisos that the total number of carbon atoms contained in all of the R groups combined may not exceed 16 and the sum of x and y may not exceed eight.

2. A method according to claim 1 wherein said hardening solution is an aqueous solution.

3. A method according to claim 1 wherein said sulfonate composition is an ammonium, alkali metal or alkaline earth metal salt.

4. A method according to claim 1 wherein said sulfonate composition is a mixture of monomers, dimers and trimers.

5. A method according to claim 1 wherein said hardening solution is an aqueous solution comprising from about one percent to about 70 weight percent of said sulfonate composition; from about 10 percent to about 50 weight percent ammonium sulfate and the balance water in an amount sufficient to maintain said sulfonate composition and said ammonium sulfate dissolved and in solution.

6. A method according to claim 1 wherein said hardening solution contains an optional amount of one or more benzene sulfonate compounds in an amount equal to from about one percent to about five percent by weight of the total solution.

7. A hardened inorganic salt composition which comprises a homogeneous mixture of an inorganic salt and from about 0.05 percent to about 0.2 percent by weight of a mixture of ammonium sulfate and a naphthalene sulfonate composition comprised of one or more monomers, dimers or trimers of one or more compounds of the formula:

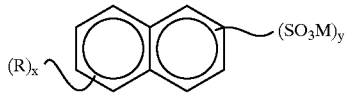

wherein M is ammonium or an alkali or alkaline earth metal; each R is independently, hydrogen or an alkyl substituent having from I to 12 carbon atoms; x is a whole number from one to seven and y is a whole number from one to two with the provisos that the total number of carbon atoms contained in all of the R groups combined may not exceed 16 and the sum of x and y may not exceed eight.

8. A hardened inorganic salt composition according to claim 7 wherein said homogeneous mixture includes an optional amount of one or more benzene sulfonate compounds in an amount of up to 0.01 weight percent of said hardened salt composition.

9. A hardened inorganic salt composition according to claim 7 wherein said inorganic salt is ammonium nitrate.

10. A hardened inorganic salt composition according to claim 7 having a surface coating of clay or wax.

11. A hardened inorganic salt composition according to claim 7 wherein at least one R group of said naphthalene sulfonate composition is other than hydrogen.

12. A hardened inorganic salt composition according to claim 7 which comprises inorganic salt and from about 0.05 percent to about 0.2 percent by weight of a mixture of ammonium sulfate; ammonium naphthalene sulfonate and one or more benzene sulfonate compounds.

13. A hardened inorganic salt composition comprising a homogeneous mixture of an inorganic salt and a mixture of ammonium sulfate and a naphthalene sulfonate composition produced by the method of claim 1.

* * * * *